(12) United States Patent
Ogawa

(10) Patent No.: US 8,319,856 B2
(45) Date of Patent: Nov. 27, 2012

(54) IMAGING APPARATUS FOR CALCULATING A HISTOGRAM TO ADJUST COLOR BALANCE

(75) Inventor: Shigeo Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/703,669

(22) Filed: Feb. 10, 2010

(65) Prior Publication Data

US 2010/0208098 A1 Aug. 19, 2010

(30) Foreign Application Priority Data

Feb. 16, 2009 (JP) ................................. 2009-033074

(51) Int. Cl.
*H04N 9/73* (2006.01)
(52) U.S. Cl. ................ 348/223.1; 348/224.1; 348/225.1; 348/655
(58) Field of Classification Search .................. 348/655, 348/690
See application file for complete search history.

(56) References Cited

U.S. PATENT DOCUMENTS

| 6,963,374 B2 * | 11/2005 | Nakamura et al. ........ 348/333.11 |
| 6,982,753 B1 * | 1/2006 | Udagawa .................... 348/223.1 |
| 2003/0016299 A1 * | 1/2003 | Matsushima ............ 348/333.02 |
| 2004/0017594 A1 * | 1/2004 | Suekane et al. ............... 358/516 |
| 2004/0090537 A1 * | 5/2004 | Kubo .......................... 348/223.1 |
| 2004/0212691 A1 * | 10/2004 | Sato ............................ 348/223.1 |
| 2004/0216912 A1 * | 11/2004 | Osborn, Jr. ................... 174/73.1 |
| 2005/0185064 A1 * | 8/2005 | Ogawa ........................ 348/222.1 |
| 2006/0170997 A1 * | 8/2006 | Takahashi ..................... 358/518 |
| 2006/0221204 A1 * | 10/2006 | Ogawa ........................ 348/223.1 |
| 2006/0238623 A1 * | 10/2006 | Ogawa ........................ 348/220.1 |
| 2007/0047019 A1 * | 3/2007 | Toyoda ......................... 358/448 |
| 2007/0159536 A1 * | 7/2007 | Lin ................................ 348/223.1 |
| 2009/0040334 A1 * | 2/2009 | Ogawa ........................ 348/223.1 |
| 2010/0245618 A1 * | 9/2010 | Ajito ........................... 348/223.1 |

FOREIGN PATENT DOCUMENTS

| JP | 2002-084440 A | 3/2002 |
| JP | 2003-244487 A | 8/2003 |

* cited by examiner

*Primary Examiner* — Jason Chan
*Assistant Examiner* — Abdelaaziz Tissire
(74) *Attorney, Agent, or Firm* — Canon USA Inc. IP Division

(57) ABSTRACT

An imaging apparatus includes an imaging unit to acquire image data, an integration unit to calculate a white balance integration value, a first calculation unit to calculate a still image white balance control value, a second calculation unit to calculate a histogram white balance control value, and a histogram processing unit. The second calculation unit calculates the histogram white balance control value by converting a white balance control value which is used in white balance processing on the image data acquired by the imaging unit in an electronic view finder (EVF) mode to the still image white balance control value, and the histogram processing unit adjusts color balance of the image data acquired by the imaging unit using the calculated histogram white balance control value and performs the histogram processing in parallel with calculation of the white balance integration value.

10 Claims, 7 Drawing Sheets

| WB MODE | COLOR TEMPERATURE (K: KELVIN) |
|---|---|
| AUTO (HIGH LUMINANCE) | 5200 K |
| AUTO (LOW LUMINANCE) | 3200 K |
| SUNLIGHT | 5200 K |
| CLOUDINESS | 6000 K |
| ELECTRIC BULB | 3200 K |
| FLUORESCENT LIGHT (NATURAL DAYLIGHT) | 4000 K |
| FLUORESCENT LIGHT H (DAYLIGHT) | 5500 K |
| FLASH | 6000 K |

IMAGING APPARATUS FOR CALCULATING A HISTOGRAM TO ADJUST COLOR BALANCE

BACKGROUND OF THE INVENTION

1. Field of the Invention

The present invention relates to an imaging apparatus which calculates a histogram.

2. Description of the Related Art

Recently, many digital cameras can generate a histogram in which image data is counted in terms of luminance. For example, Japanese Patent Application Laid-Open No. 2002-84440 discusses a digital camera which can reduce the time necessary for histogram processing. In such a digital camera, the image data size is resized and reduced, and the histogram is calculated based on the reduced image data. As a result, the time necessary for histogram processing is shortened.

Further, Japanese Patent Application Laid-Open No. 2003-244487 discusses a digital camera which can reduce a load on a system by efficiently performing histogram processing. Such a digital camera is controlled to calculate the histogram when a shooting condition changes, so that a processing load is reduced.

The digital camera calculates the histogram from image data of a still image and optimizes signal processing settings according to the resulting histogram to improve image quality. However, time required for calculating the histogram from the image data of the still image is simply added to time required for developing the still image, so that performance is lowered.

On the other hand, since the digital camera calculates the histogram to acquire a setting value for performing developing processing, image data before developing processing is employed as an input image for histogram processing. However, color balance is not corrected in the image data before developing processing, so that the resulting histogram does not correctly reflect the shooting condition.

SUMMARY OF THE INVENTION

The present invention is directed to a technique capable of performing appropriate histogram processing on captured image data without extending processing time for developing the captured image data.

According to an aspect of the present invention, an imaging apparatus includes an imaging unit configured to capture an image of an object and acquire image data, an integration unit configured to calculate a white balance integration value for calculating a still image white balance control value from the image data acquired by the imaging unit, a first calculation unit configured to calculate the still image white balance control value using the white balance integration value calculated by the integration unit, a second calculation unit configured to calculate a histogram white balance control value to be used in histogram processing, and a histogram processing unit configured to adjust color balance of the image data acquired by the imaging unit and perform histogram processing. The second calculation unit calculates the histogram white balance control value by converting a white balance control value which is used to perform white balance processing on the image data acquired by the imaging unit in an electronic view finder (EVF) mode to the still image white balance control value, and the histogram processing unit adjusts the color balance of the image data acquired by the imaging unit using the calculated histogram white balance control value and performs the histogram processing in parallel with calculation of the white balance integration value by the integration unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a table indicating predetermined color temperatures corresponding to user settings.

DESCRIPTION OF THE EMBODIMENTS

Various exemplary embodiments, features, and aspects of the invention will be described in detail below with reference to the drawings.

Figure 1:
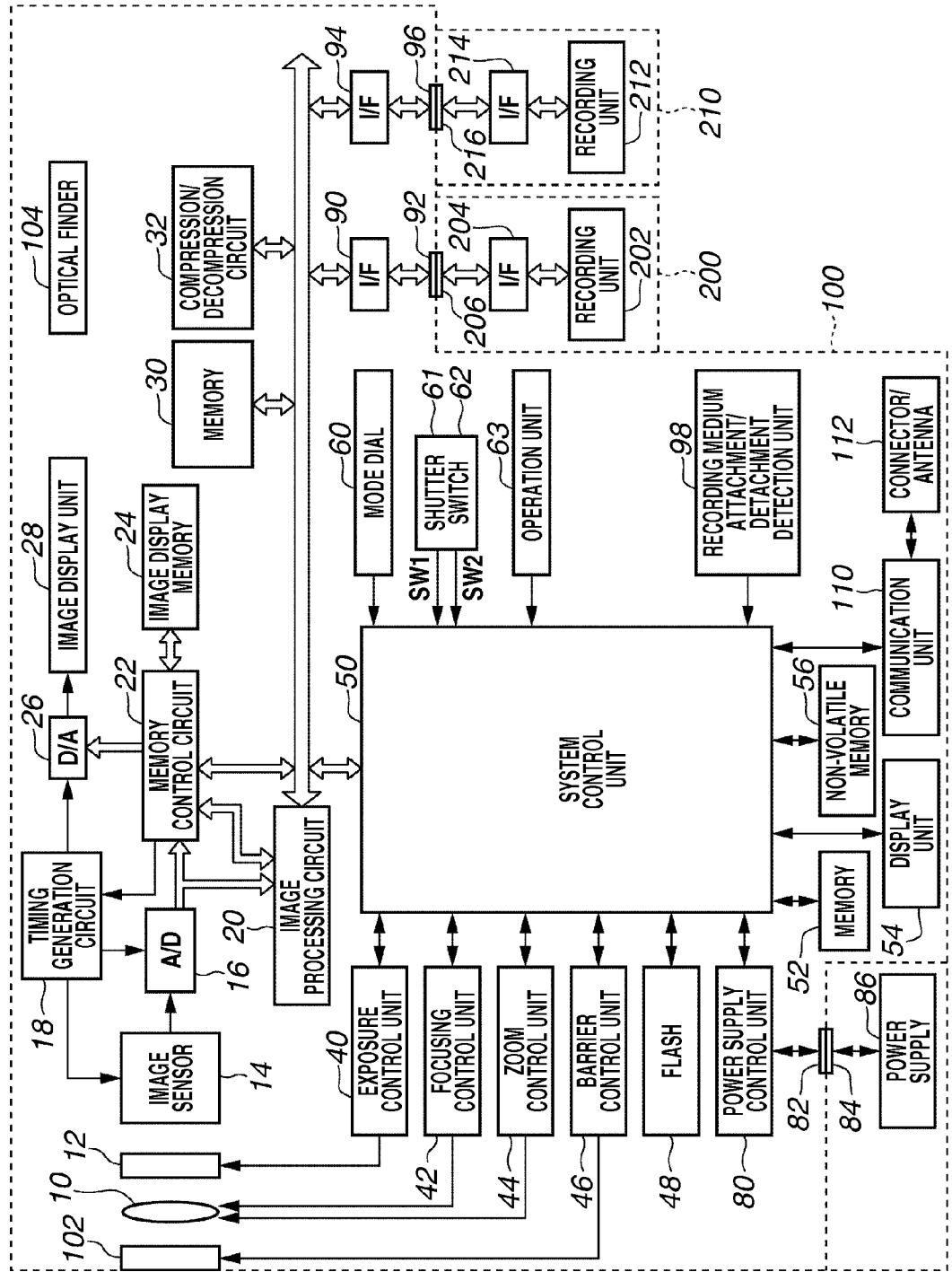
FIG. 1 is a block diagram illustrating an imaging apparatus.

FIG. 1 illustrates a configuration of an imaging apparatus according to an exemplary embodiment of the present invention.

An imaging apparatus 100 includes a protection unit 102, photographic lens 10, a shutter 12, an image sensor 14, an analog to digital (A/D) converter 16, a timing generation circuit 18, and an image processing circuit 20. The protection unit 102 serves as a cover to protect an imaging unit including the photographic lens 10 from soiling and breakage. The shutter 12 includes a diaphragm function. The image sensor 14 converts an optical image to electric signals. The A/D converter 16 coverts an analog signal output from the image sensor 14 to a digital signal. The timing generation circuit 18 supplies a clock signal and a control signal to the image sensor 14, the A/D converter 16, and a digital to analog (D/A) converter 26. The timing generation circuit 18 is controlled by a memory control circuit 22 and a system control unit 50.

The image processing circuit 20 performs predetermined pixel interpolation and color conversion on data received from the A/D converter 16 or the memory control circuit 22. Further, the image processing circuit 20 performs a predetermined calculation using the captured image data. Furthermore, the image processing circuit 20 performs a predetermined calculation using the captured image data and through-the-lens (TTL) auto-white balance (AWB) processing based on the calculation result. In white balance processing, block integration is performed by dividing a video signal into a plurality of blocks and acquiring an integration value of a color signal for each block to calculate the white balance. Further, white search integration is performed by converting a signal value of each pixel in the video signal onto a chromaticity coordinate and acquiring an integration value of the color signal for a predetermined region. A setting of an integration region on the chromaticity coordinate which is used in the white search integration is stored in the image processing circuit 20.

The imaging apparatus 100 further includes the memory control circuit 22, an image display memory 24, the D/A converter 26, and an image display unit 28.

The memory control circuit 22 controls the A/D converter 16, the timing generation circuit 18, the image processing circuit 20, the D/A converter 26, a memory 30 and a compression/decompression circuit 32. The data of the A/D converter 16 is written in the image display memory 24 or the memory 30 via the image processing circuit 20 and the memory control circuit 22, or via the memory control circuit 22.

The image display unit 28 is, for example, a thin-film transistor (TFT) liquid crystal display (LCD). Image data for display which is written in the image display memory 24 is displayed on the image display unit 28 via the D/A converter 26. An electronic finder function can be implemented by sequentially displaying the captured image data using the image display unit 28. Further, the image display unit 28 can arbitrarily switch a display screen on and off according to an instruction from a system control unit 50. If the image display unit 28 turns off the display, power consumption of the imaging apparatus 100 can be greatly reduced.

The imaging apparatus 100 further includes the memory 30, the compression/decompression circuit 32, an exposure control unit 40, a focusing control unit 42, a zoom control unit 44, a barrier control unit 46, a flash unit 48, and the system control unit 50.

The memory 30 stores captured still images and moving images. The memory 30 has a storage capacity large enough to store a predetermined number of still images and a moving image corresponding to a predetermined period of time. Therefore, a large amount of image data can be written in the memory 30 at high speed in both a continuous shooting mode of continuously shooting a plurality of still images and a panorama shooting mode. Further, the memory 30 can be used as a work area of the system control unit 50.

The compression/decompression circuit 32 compresses and decompresses the image data using adaptive discrete cosine transform (ADCT). The compression/decompression circuit 32 reads an image stored in the memory 30 and compresses or decompresses the image, and writes the processed data in the memory 30.

The system control unit 50 controls the entire imaging apparatus 100. The exposure control unit 40 controls the shutter 12 which includes the diaphragm function. Further, the exposure control unit 40 includes a flash light amount control function in cooperation with the flash unit 48. The focusing control unit 42 controls focusing of the photographic lens 10. The exposure control unit 40 and the focusing control unit 42 are controlled by a TTL system.

More specifically, the system control unit 50 performs auto-focus (AF) processing, automatic exposure (AE) processing, and electronic flash pre-emission (EF) processing according to the TTL system by controlling the exposure control unit 40 and the focusing control unit 42 based on a calculation result obtained by the image processing unit 20. The zoom control unit 44 controls zooming of the photographic lens 10. The barrier control unit 46 controls an operation of the protection unit 102. The flash unit 48 includes a function of emitting AF auxiliary light and the light amount control function.

Moreover, the imaging apparatus 100 includes a memory 52, a display unit 54, and a non-volatile memory 56.

The memory 52 stores constants, variables, and programs to be used in operations of the system control unit 50. Further, the memory 52 stores a program diagram to be used in the AE processing. The program diagram is a table which defines a relationship between an aperture diaphragm diameter corresponding to an exposure value and a control value of shutter speed.

The display unit 54 may include an LCD or a speaker which displays an operation state or a message using characters, images, and sound according to execution of a program by the system control unit 50. One display unit 54 or a plurality of display units 54 may be provided near an operation unit 63 of the imaging apparatus 100 so that it is easily visible for a user. The display unit 54 may be configured as a combination of an LCD, a light-emitting diode (LED), and a sound generator. A part of the functions of the display unit 54 is installed within an optical finder 104.

Display contents of the display unit 54 which are displayed on the LCD may include indications of single shot/continuous shooting, self timer, a compression rate, a number of recorded pixels, a number of recorded shots, a remaining number of shots, a shutter speed, an aperture value, and exposure correction. Further, the display unit 54 may display on the LCD, indications such as, flash, red-eye reduction, macro shooting, buzzer setting, remaining amount of a clock battery, remaining amount of batteries, error information, information in a plurality of digits, a detached/attached state of a recording medium, a communication interface operation, and date and time.

The display contents of the display unit 54 which are displayed in the optical finder 104 may include indications of in-focus, camera-shake warning, flash charge, shutter speed, aperture value, and exposure correction.

The non-volatile memory 56 is an electrically erasable and recordable memory such as an electrically erasable programmable read-only memory (EEPROM).

The imaging apparatus 100 further includes a mode dial 60, a shutter switch (SW1) 61, a shutter switch (SW2) 62, and the operation unit 63 which are input units for a user to input various operation instructions to the system control unit 50. Such input units are configured with a single device such as a switch, a dial, a touch panel, pointing using line-of-sight detection, and a speech recognition apparatus or a combination of a plurality of these devices.

The mode dial 60 can be used to specify switching between functional modes such as power off, automatic shooting mode, shooting mode, panoramic shooting mode, reproduction mode, multiple screen reproducing/erasing mode, and personal computer (PC) connection mode.

The shutter switch (SW1) 61 is switched on by a half stroke of a shutter button (not illustrated) and instructs start of AF processing, AE processing, AWB processing, and EF processing.

The shutter switch (SW2) 62 is switched on by a full stroke of the shutter button (not illustrated) and instructs start of a series of processing. The series of processing include exposure processing to write signals read from the image sensor 14 into the memory 30 via the A/D converter 16 and the memory control circuit 22, developing processing employing calculations performed by the image processing circuit 20 and the memory control circuit 22, and recording processing. In the recording processing, the image data read from the memory 30 is compressed by the compression/decompression circuit 32 and then written into the recording media 200 and 210.

The operation unit 63 includes various buttons and touch panels, such as a menu button, a set button, a macro selection button, a multi-screen reproduction and page-advance button, a flash setting button, and a single-shot/serial-shot/self-timer selection button. Further, the operation unit 63 includes a forward (+) menu item selection button, a backward (−) menu item selection button, a forward (+) reproduction image search button, a backward (−) reproduction image search button, a shooting quality selection button, an exposure correction button, and a date/time set button.

The imaging apparatus 100 further includes a power supply control unit 80, connectors 82 and 84, a power supply 86, interfaces 90 and 94, the optical finder 104, a communication unit 110, a connector (antenna) 112, and a recording medium attachment/detachment state detection unit 98.

The power supply control unit 80 includes a battery detection circuit, a direct current (DC)-DC converter, and a switch circuit for switching the blocks to be energized. The power supply control unit 80 detects the attached/detached state of the battery, a battery type and the remaining battery power level, and controls the DC-DC converter based on the detection result and an instruction from the system controller 50. The power supply control unit 80 then supplies a necessary voltage for a necessary period to each of the units including the recording medium. The power supply 86 may include a primary battery such as an alkaline battery or a lithium battery, a secondary battery such as a BNiCd battery, an NiMH battery, or an Li battery, and an alternate current (AC) adapter.

Interfaces 90 and 94 transmit and receive data to and from the recording media 200 and 210 such as a memory card or a hard disk. The connectors 92 and 96 connect the imaging apparatus 100 and the recording media 200 and 210. The recording medium attachment/detachment detection unit 98 detects whether the recording medium 200 or the recording medium 210 is connected to the connector 92 or the connector 96. The present exemplary embodiment describes a case where there are two systems of interfaces and connectors for attaching the recording medium. However, there can be any number of systems of interfaces and connectors for attaching the recording medium. Further, interfaces and connectors pursuant to different standards may be combined.

Cards in conformity with Personal Computer Memory Card International Association standards (PCMCIA cards) or cards in conformity with compact flash (CF) card standards may be used as the interfaces and connectors. In such a case, various communication cards such as a local area network (LAN) card, a modem card, a universal serial bus (USB) card, an Institute of Electrical and Electronics Engineers (IEEE) 1394 card, a P1284 card, a small computer system interface (SCSI) card, and a personal handyphone system (PHS) are connected. According to this configuration, image data and management information attached to the image data can be transmitted and received between other peripheral devices such as a computer and a printer.

The optical finder 104 is a window for confirming an object to be captured without using the electronic viewfinder function of the image display unit 28. A part of the functions of the display unit 54 including an indication of in-focus state, a camera shake warning, a flash charge state, a shutter speed, an aperture value, and exposure correction are displayed inside the optical finder 104.

The communication unit 110 includes various communication functions such as Recommended Standard (RS) 232C, USB, IEEE 1394, P1284, SCSI, modem, LAN, and wireless communication.

The connector (antenna) 112 connects the imaging apparatus 100 with other devices via the communication unit 110. The connector 112 functions as an antenna when performing wireless communication.

The recording media 200 and 210 such as the memory card or the hard disk are detachably attached to the imaging apparatus 100. The recording media 200 and 210 include recording units 202 and 212 configured by a semiconductor memory or a magnetic disk, and interfaces 204 and 214 respectively. Further, the recording media 200 and 210 includes connectors 206 and 216 for connecting with the imaging apparatus 100.

Figure 2:
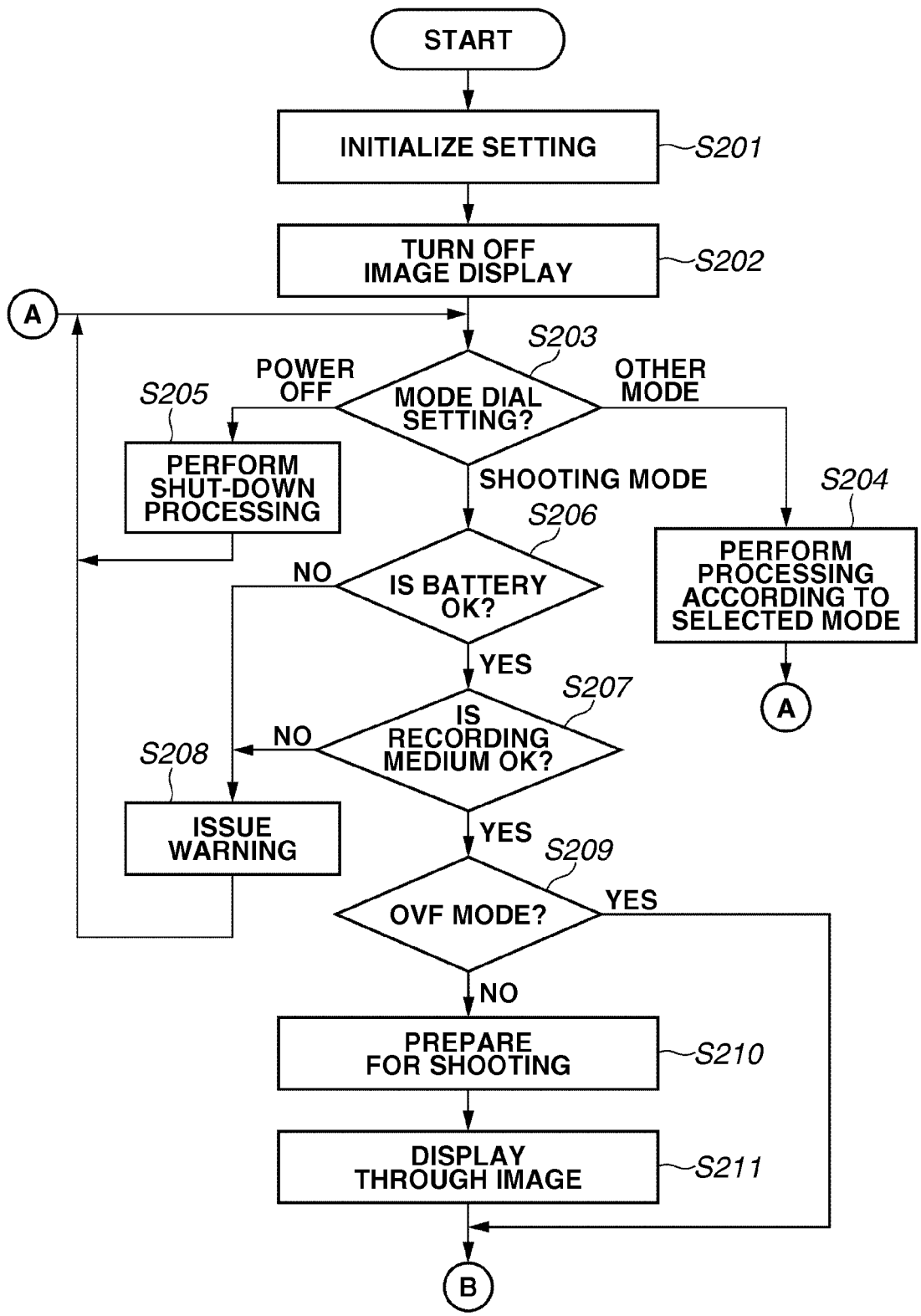
FIG. 2 is a flowchart illustrating a main operation of an imaging apparatus.
Figure 3:
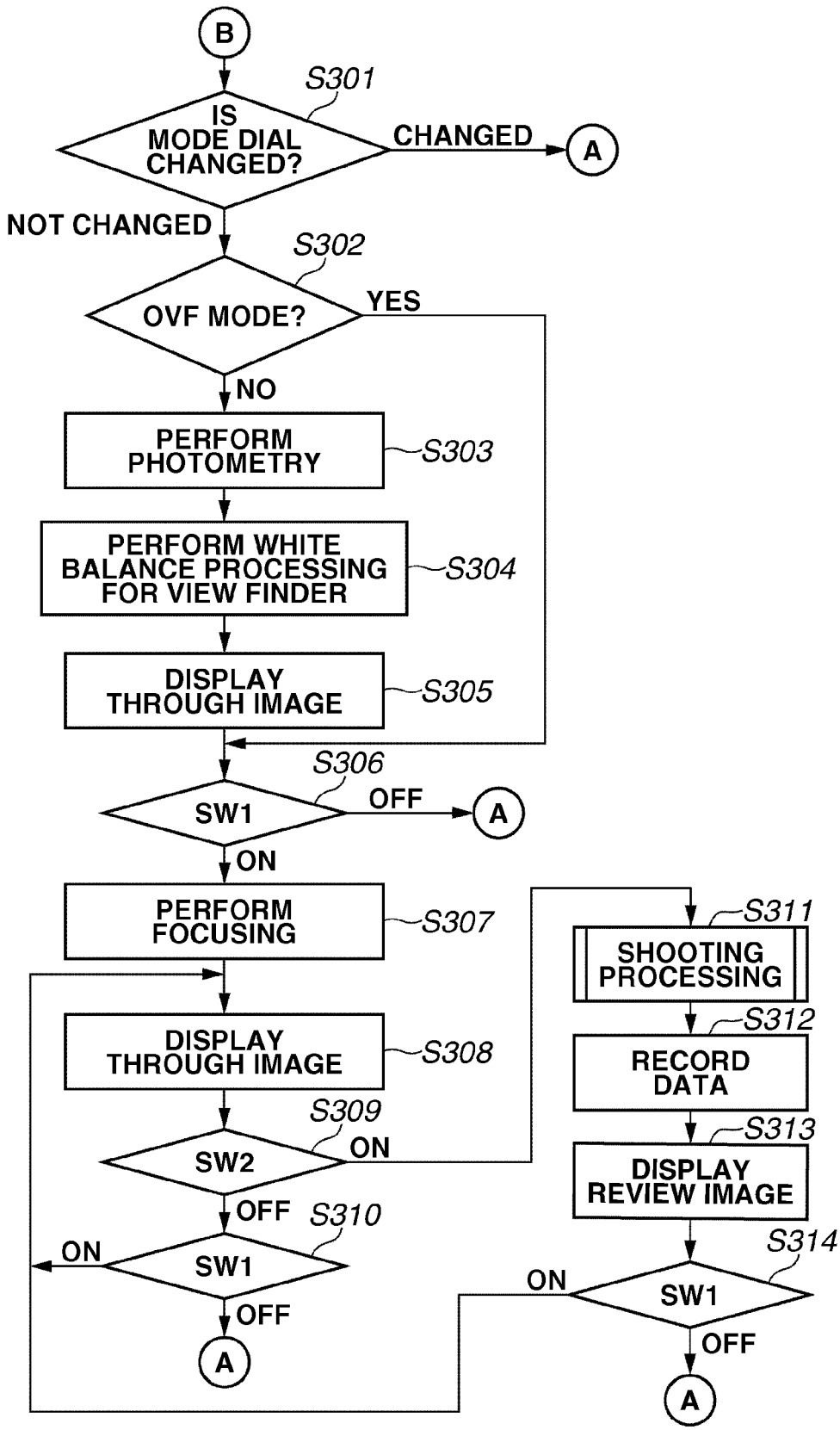
FIG. 3 is a flowchart illustrating a still image shooting process performed by an imaging apparatus.
Figure 4:
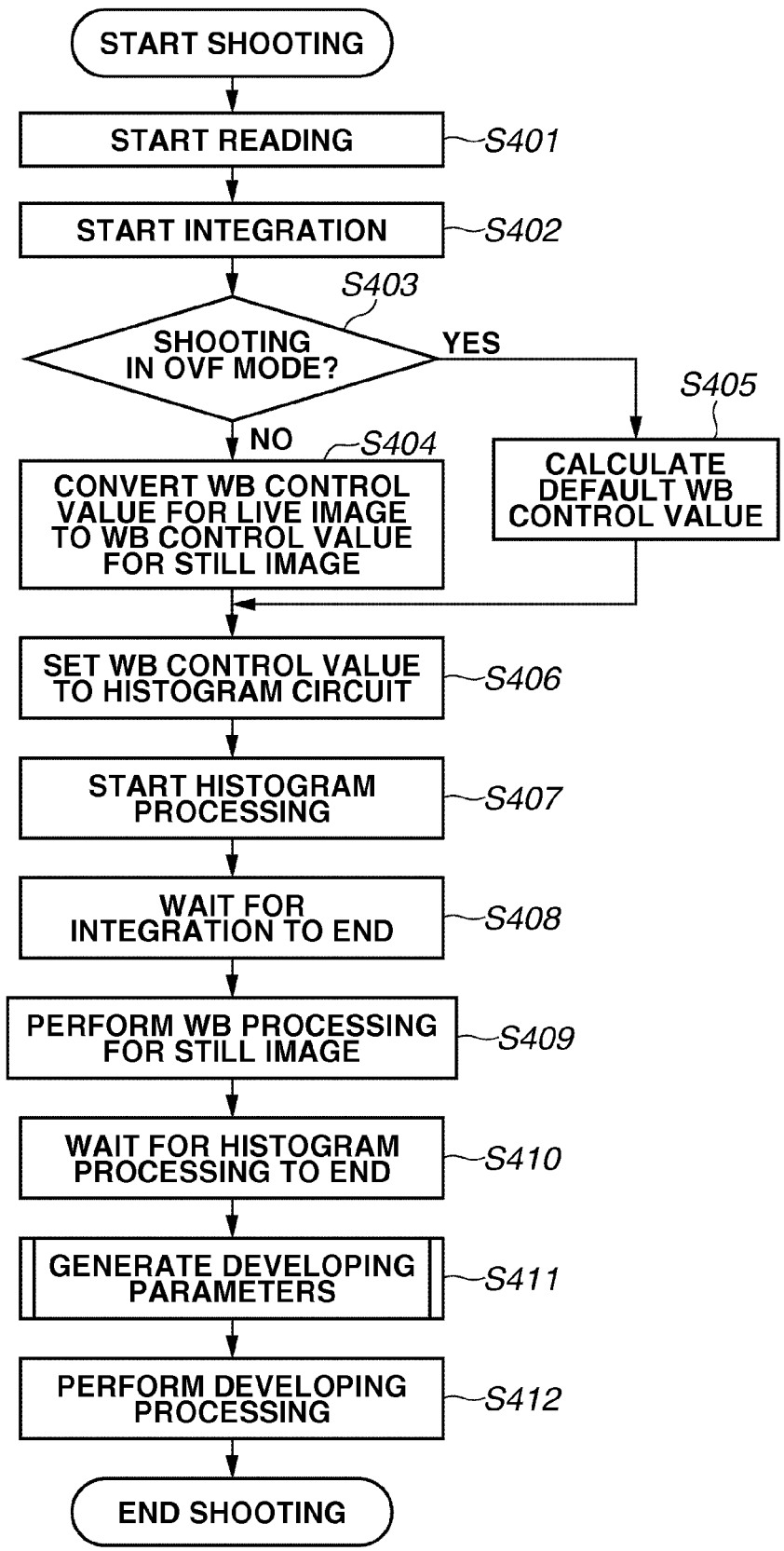
FIG. 4 is a flowchart illustrating a still image shooting process performed by an imaging apparatus.

Operation processing of the imaging apparatus 100 according to the present exemplary embodiment will be described below with reference to FIGS. 2, 3, and 4. The processing illustrated in the flowcharts of FIGS. 2, 3, and 4 are realized by the system control unit 50 executing a program stored in the memory 52.

The processing performed before the imaging apparatus captures an image will be described below with reference to FIG. 2. The processing is started by switching on the imaging apparatus 100, for example, by changing the battery.

In step S201, the system control unit 50 initializes flags and control variables. In step S202, the system control unit 50 initializes the image display unit 28 to a display off state.

In step S203, the system control unit 50 determines whether the mode dial 60 is set to a power supply off position, a shooting mode position, or other mode position. If the mode dial 60 is set to the power supply off position (POWER OFF in step S203), the processing proceeds to step S205.

In step S205, the system control unit 50 ends displaying on each display unit and closes the barrier of the protection unit 102 to protect the imaging unit. Further, the system control unit 50 records necessary parameters and setting values including the flags and the control variables, and setting modes in the non-volatile memory 56. Furthermore, the power supply control unit 80 performs predetermined shut down processing, such as shutting down unnecessary power supplies of each of the units in the imaging apparatus 100 including the image display unit 28. The processing then returns to step S203.

If the mode dial 60 is set to other mode position in step S203 (OTHER MODE in step S203), the processing proceeds to step S204. In step S204, the system control unit 50 executes the processing according to the selected mode. The processing then returns to step S203. Further, if the mode dial 60 is set to the shooting mode in step S203 (SHOOTING MODE in step S203), the processing proceeds to step S206.

In step S206, the system control unit 50 determines, using the power supply control unit 80, whether the remaining amount or the operating state of the power supply 86 may cause adverse effects on the operation of the imaging apparatus 100. If there is a problem with the power supply 86 (NO in step S206), the processing proceeds to step S208. In step S208, the system control unit 50 outputs a predetermined warning with an image or sound using the display unit 54, and the processing returns to step S203. On the other hand, if there is no problem (YES in step S206), the processing proceeds to step S207.

In step S207, the system control unit 50 determines whether the operating state of the recording media 200 and 210 may cause adverse effects on the operation of the imaging apparatus 100, particularly, on the operation for recording or reproducing the image data thereto or therefrom. If there is a problem with the recording media 200 and 210 (NO in step S207), the processing proceeds to step S208 in which the above-described predetermined warning is output, and the processing then returns to step S203. If there is no problem (YES in step S207), the processing proceeds to step S209.

In step S209, the system control unit 50 determines whether the finder mode is set to an optical view finder (OVF)

mode, or more specifically, whether the finder mode is set to the OVF mode or an electronic view finder (EVF) mode.

The OVF mode is a mode for confirming the object to be shot using the optical finder 104. On the contrary, the EVF mode is a mode for confirming the object to be shot by displaying a through-the-lens image on the image display unit 28 as the finder function. The through-the-lens image is a moving image captured by the image sensor 14 before and after shooting the still image.

If the system control unit 50 determines that the finder mode is set to the OVF mode (YES in step S209), the processing proceeds to the flowchart illustrated in FIG. 3 without displaying the through-the-lens image. On the other hand, if the system control unit 50 determines that the finder mode is set to the EVF mode (NO in step S209), the processing proceeds to step S210.

In step S210, the system control unit 50 initializes shooting preparation processing to display the through-the-lens image on the image display unit 28.

In step S211, the system control unit 50 starts display of the through-the-lens image via the image display unit 28 after completing the shooting preparation. When the through-the-lens image is displayed, the image data is sequentially written in the image display memory 24 via the image sensor 14, the A/D converter 16, the image processing circuit 20, and the memory control circuit 22. The written image data is then sequentially displayed on the image display unit 28 via the memory control circuit 22 and the D/A converter 26 to realize an electronic view finder function.

Figure 5:
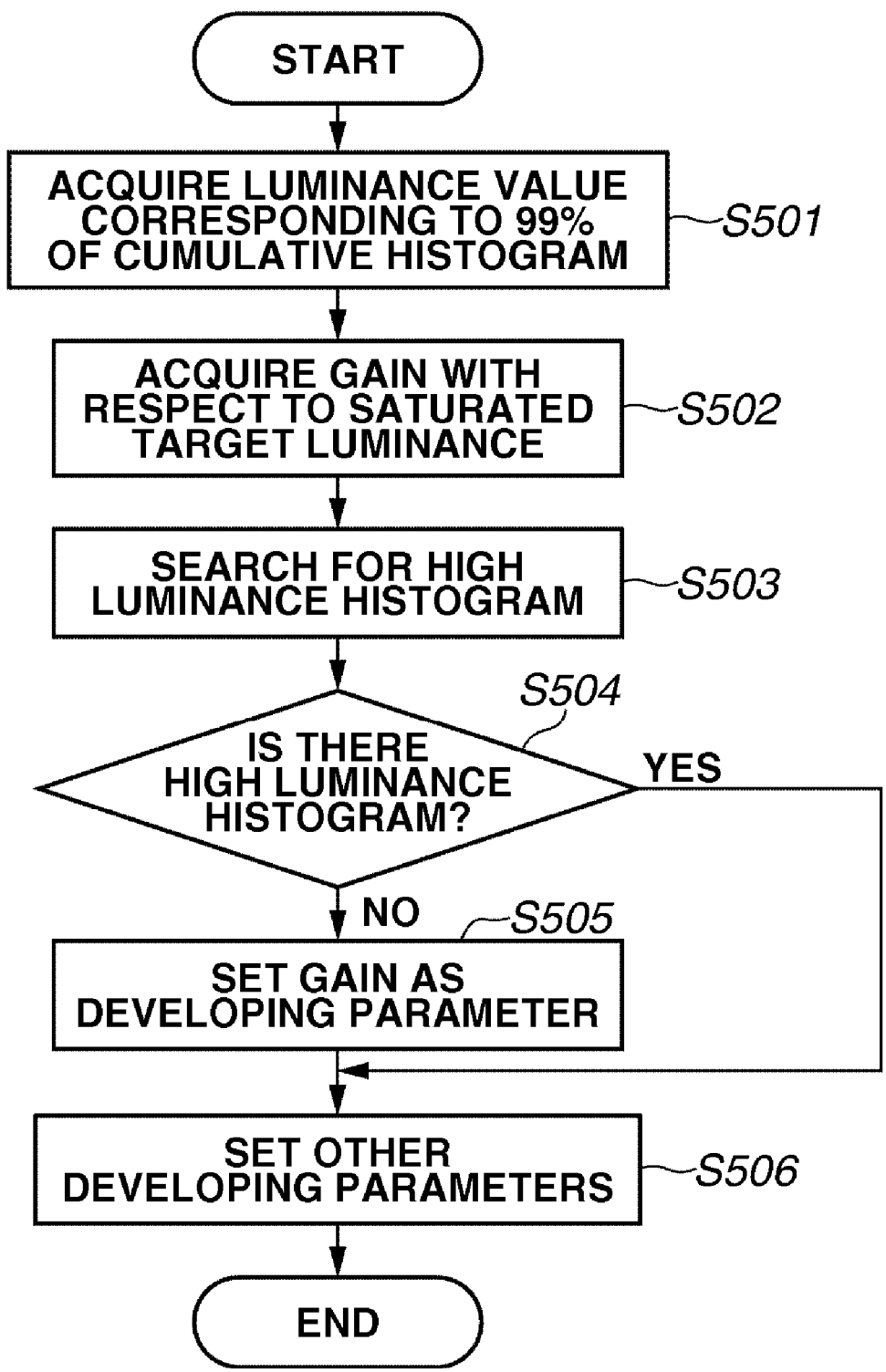
FIG. 5 is a flowchart illustrating a still image shooting process performed by an imaging apparatus.

The camera operation for performing still image shooting by displaying the through-the-lens image will be described below with reference to FIGS. 3, 4, and 5.

In step S301, the system control unit 50 determines whether the mode dial 60 is changed. If the mode dial 60 is changed (YES in step S301), the processing returns to step S203 in FIG. 2. If the mode dial 60 is not changed (NO in step S301), the processing proceeds to step S302.

In step S302, the system control unit 50 determines whether the OVF mode is set, or more specifically, whether the OVF mode or the EVF mode is set. If the OVF mode is set (YES in step S302), the processing proceeds to step S306. If the EVF mode is set (NO in step S302), the processing proceeds to step S303.

In step S303, the system control unit 50 performs processing for continuing to display the through-the-lens image. For example, the system control unit 50 performs a predetermined photometry calculation on an image signal which the image processing circuit 20 acquired from the image sensor 14. The system control unit 50 then stores a calculation result in the memory 30, or performs AE processing on the through-the-lens image using the exposure control unit 40 based on the calculation result.

In step S304, the system control unit 50 performs white balance processing in the EVF mode. More specifically, the system control unit 50 performs a predetermined white balance calculation on the image signal that the image processing circuit 20 acquired from the image sensor 14 and stores the calculation result in the memory 30. The system control unit 50 then sets a white balance control value on the image processing circuit 20 based on the calculation result and performs the white balance processing on the through-the-lens image.

In step S305, the system control unit 50 displays on the image display unit 28 the through-the-lens image on which white balance processing has been performed.

In step S306, the system control unit 50 determines whether a user pressed the shutter switch (SW1) 61. If the user has not pressed the shutter switch (SW1) 61 (OFF in step S306), the processing returns to step S203 in FIG. 2. If the user pressed the shutter switch (SW1) 61 (ON in step S306), the processing proceeds to step S307.

In step S307, the system control unit 50 performs a predetermined focusing calculation on the image signal that the image processing circuit 20 acquired from the image sensor 14 and stores the calculation result in the memory 30. The system control unit 50 then performs AF processing based on the calculation result by the focusing control unit 42 and adjusts an in-focus point of the photographic lens 10 on the object.

In step S308, the system control unit 50 displays the through-the-lens image on the image display unit 28.

In step S309, the system control unit 50 determines whether the user pressed the shutter switch (SW2) 62. If the user has not pressed the shutter switch (SW1) 62 (OFF in step S306), the processing proceeds to step S310. In step S310, the system control unit 50 determines whether the user pressed the shutter switch (SW1) 61. If the user has not pressed the shutter switch (SW1) 61 (OFF in step S310), the processing returns to step S203 in FIG. 2. If the user pressed the shutter switch (SW1) 61 (ON in step S310), the processing returns to step S308.

If the user pressed the shutter switch (SW2) 62 (ON in step S309), the processing proceeds to step S311.

In step S311 to step S313, the system control unit 50 executes the still image shooting process in which a series of shooting operations is performed.

In step S311, the system control unit 50 performs the still image shooting processing using a method described below with reference to FIG. 4.

In step S312, the system control unit 50 writes the compressed image data stored in the memory 30 in step S311 into the storage medium 200 as a still image file.

In step S313, the system control unit 50 displays the image data shot in step S311 as an image on the image display unit 28 and ends the still image shooting processing.

In step S314, the system control unit 50 determines whether the user pressed the shutter switch (SW1) 61. If the user pressed the shutter switch (SW1) 61 (ON in step S314), the processing returns to step S308, and the system control unit 50 display the through-the-lens image and returns to a shooting standby state. If the user has not pressed the shutter switch (SW1) 61 (OFF in step S314), the processing returns to step S203 in FIG. 2.

The still image shooting processing will be described below with reference to the flowchart illustrated in FIG. 4. The processing corresponds to the processing performed in step S311 in the flowchart illustrated in FIG. 3.

In step S401, the system control unit 50 starts reading the image signals from the image sensor 14 in synchronization with the timing generation circuit 18. If flash photography is performed as a result of the AE processing in step S303, the system control unit 50 flashes the flash 48 in synchronization with a first curtain or a second curtain of the image signals. The system control unit 50 then converts the image signals that are sequentially readout from the image sensor 14 to the image data via the A/D converter 16 and sequentially stores the converted image data in the memory 30.

In step S402, the system control unit 50 performs integration processing in parallel with reading the image signals in step S401. More specifically, the system control unit 50 divides the screen into a plurality of blocks and calculates an integration value (i.e., a white balance value) of the signal level for each block. The system control unit 50 uses the calculated integration value in the white balance processing described below.

More specifically, the system control unit 50 reads the image data stored in the memory 30 which is read from the image sensor 14, performs integration processing thereon using the image processing circuit 20, and stores integration result data in the memory 30. The system control unit 50 performs such processing with a little time lag from performing the process of step S401.

In step S403, the system control unit 50 determines whether the still image shooting is performed in the OVF mode. If the still image shooting is performed in the OVF mode (YES in step S403), the processing proceeds to step S405. On the other hand, if the still image shooting is performed in the EVF mode (NO in step S403), the processing proceeds to step S404.

In step 404, which is performed when the still image shooting is performed in the EVF mode, the system control unit 50 acquires from the memory 30 the white balance control value for the EVF mode calculated in step S304 illustrated in FIG. 3. The system control unit 50 then converts the acquired white balance control value for the EVF mode to a white balance control value for performing still image shooting. More specifically, the image sensor 14 is controlled differently when shooting the image in the EVF mode and when shooting a still image, so that the balance of sensitivity for each color is different in the image sensor 14. Therefore, the white balance control value calculated in the EVF mode cannot be applied as it is to the white balance value for the still image shooting.

The system control unit 50 thus applies a unique conversion coefficient to the image sensor 14 and converts the white balance control value for the EVF mode to the white balance value for performing the still image shooting. Since the acquired white balance control value for performing the still image shooting is an approximate value calculated from the white balance control value for the EVF mode, the acquired white balance control value is only used to optimize the color balance in a histogram described below. On the contrary, a white balance control value calculated by performing white balance processing for the still image described below is used for performing developing progressing on the still image.

The system control unit 50 then stores in the memory 30 the white balance control value converted for performing the still image shooting as the white balance control value for the histogram.

On the other hand, the processing in step S405 is performed when the still image is shot in the OVF mode, so that the white balance control value for the EVF mode cannot be acquired. The system control unit 50 thus determines a default white balance control value according to a user setting value of the white balance stored in the non-volatile memory 56.

An example of a relation between the user setting value of the white balance and the default white balance control value will be described below with reference to FIG. 7. Referring to FIG. 7, a table 701 includes color temperatures corresponding to user setting values of the white balance. The color temperature and the white balance control value can be mutually converted by performing a predetermined calculation. The white balance control value can thus be determined by referring to the color temperature corresponding to the user setting value of the white balance illustrated in the table 701.

In the table 701, when the user setting of the white balance is automatic, two setting values are specified for high luminance and low luminance and are switched between the two settings according to object luminance. The user settings of the white balance other than the automatic setting each corresponds to one color temperature, so that one white balance control value can be determined. The white balance control value which is thus determined based on the user setting is only used in optimizing the color balance in the histogram described below. On the contrary, a white balance control value calculated by performing white balance processing for the still image described below is used for performing developing progressing on the still image.

The system control unit 50 then stores in the memory 30 the white balance control value determined based on the table 701 as the white balance control value to be used on the histogram.

In step S406, the system control unit 50 sets the white balance control value to be used on the histogram acquired in step S404 or 5405 to a histogram circuit in the image processing circuit 20. There is a circuit which applies a gain for each color in an input setting of the histogram circuit in the image processing circuit 20. The color balance of the image input in the histogram circuit can thus be appropriately adjusted by setting the white balance control value for the histogram.

In step S407, the system control unit 50 starts performing histogram processing. More specifically, the system control unit 50 sequentially inputs to the image processing circuit 20 the image data stored in the memory 30 and writes a histogram calculation result in the memory 30. The processing then proceeds to step S408.

In step S408, the system control unit 50 waits for completion of the integration processing started in step S402. When the integration processing is completed, the processing proceeds to step S409.

In step S409, the system control unit 50 performs white balance processing for the still image. More specifically, the system control unit 50 reads from the memory 30 the integration processing result acquired in step S402 and calculates the white balance control value for the still image by executing a predetermined white balance calculation. The system control unit 50 stores the white balance control value for the still image in the memory 30. The system control unit 50 then performs the white balance processing on the image data stored in the memory 30 using the calculated white balance control value.

In step S410, the system control unit 50 waits for the completion of the histogram processing started in step S407. When the histogram processing is completed, the processing proceeds to step S411.

In step S411, the system control unit 50 generates parameters to be set for developing processing. The processing performed in step S411 will be described below with reference to FIG. 5.

In step S412, the system control unit 50 instructs the image processing circuit 20 to perform developing processing, i.e., a series of processing including performing predetermined developing processing and compression based on Joint Photographic Experts Group (JPEG) and storing the processed image data in the memory 30. Upon the system control unit 50 causing the image processing circuit 20 to store the processed image data in the memory 30, the series of developing processing ends.

The processing for generating the developing parameters will be described below with reference to the flowchart illustrated in FIG. 5. The processing corresponds to the processing performed in step S411 in the flowchart illustrated in FIG. 4.

In step S501, the system control unit 50 calculates a saturated luminance value from the result of histogram processing performed in step S407. More specifically, the system control unit 50 reads from the memory 30 the result of histogram processing performed in step S407, detects a luminance value which corresponds to 99% of a cumulative histogram, and stores in the memory 30 the detected value as the saturated luminance.

In step S502, the system control unit 50 calculates a difference between a target saturated luminance and the saturated luminance value stored in the memory 30 as a gain. The gain is calculated using the following equation:

Gain=target saturated luminance/saturated luminance value

The gain is limited between 1.0 and 1.4.

In step S503, the system control unit 50 refers to the result of the histogram processing stored in the memory 30 and searches for a high luminance histogram. More specifically, the system control unit 50 defines a luminance which is equal to or greater than 200 in a range of an 8-bit gradation (0 to 255) as high luminance and searches whether the histogram appears at luminance values equal to or greater than a threshold value.

In step S504, the system control unit 50 determines whether there is a high luminance histogram. If there is a high luminance histogram (YES in step S504), the processing proceeds to step S506. On the other hand, if there is no high luminance histogram (NO in step S504), the processing proceeds to step S505.

In step S505, the system control unit 50 determines that the high luminance histogram does not appear due to a low contrast image which does not fully use the dynamic range. The system control unit 50 thus sets the gain calculated in step S502 to the image processing circuit 20. The processing then proceeds to step S506.

In step S506, the system control unit 50 sets the developing parameters other than the gain. More specifically, the system control unit 50 sets predetermined values in the image processing circuit 20 as the developing parameters such as sharpness. The processing for generating the developing parameters thus ends.

A timing chart which illustrates the still image shooting processing in a chronological order will be described below with reference to FIG. 6.

Figure 6:
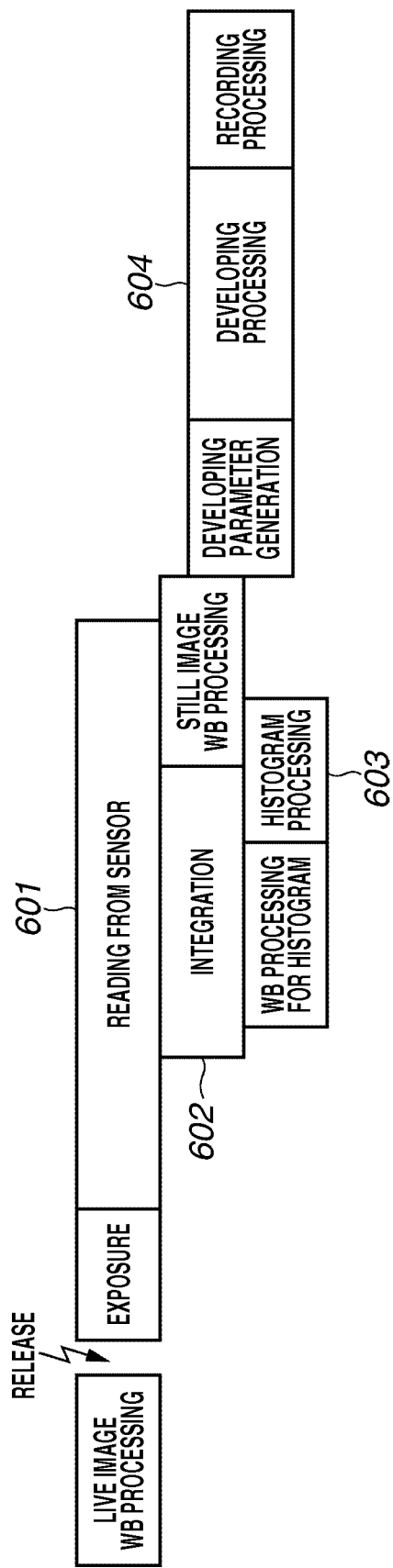
FIG. 6 illustrates a timing chart of a still image shooting process performed by an imaging apparatus.

As illustrated in FIG. 6, according to the present exemplary embodiment, histogram processing 603 is performed in parallel with reading the video signal (i.e., reading from sensor 601) and performing integration processing (i.e., integration 602). As a result, the histogram processing can be performed without delaying the developing processing to start (i.e., developing processing 604) and thus without extending the entire development time. Further, the histogram processing can be correctly performed from the video signal of the still image by executing the white balance processing for the histogram.

As described above, the histogram can be generated without extending the development time of the still image, and a correct histogram can be generated from the video signal of the still image.

According to the present exemplary embodiment, an image quality can be improved by calculating the histogram from the shot image and optimizing the settings for image processing according to the result of performing histogram processing. Such histogram processing can be performed without extending the time for developing still image. Further, when the histogram is calculated, a correct histogram which takes into account shooting conditions and device characteristics can be acquired by adjusting the color balance.

The present exemplary embodiment is described based on an example in which the user setting value of the white balance is automatic, sunlight, and the like. However, the user setting value of the white balance is not limited to the above-described examples, and the white balance control value for the histogram can be calculated based on other shooting conditions and settings of the imaging apparatus. For example, if the imaging apparatus is set to a manual white balance mode in which the user designates the color temperature, the white balance control value for the still image is fixed, so that it is not necessary to use the white balance control value of the EVF mode. In other words, the fixed white balance control value can be used as the white balance control value for the histogram.

Further, if the imaging apparatus is set so that the user adjusts the white balance using white paper as a target, a white balance control value targeted on the white paper can be applied as the white balance control value for the histogram.

Furthermore, if the white balance control value for the EVF mode is used in performing flash photography, the control value becomes totally different from the white balance control value of the shot image. Therefore, when it is determined that flash photography is set to the imaging apparatus, the system control unit 50 uses the color temperature of the flash illustrated in the table 701 to calculate the white balance control value.

Moreover, if the white balance control value for the EVF mode is not stable, processing similar to the processing in step S405 illustrated in FIG. 4 can be performed. More specifically, the system control unit 50 determines in step S304 illustrated in FIG. 3 whether the white balance control value is stable when the white balance processing is performed on the through-the-lens image in the EVF mode. If it is determined that the white balance control value is not stable, the system control unit 50 calculates the white balance control value using the color temperatures described in the table 701 illustrated in FIG. 7.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-033074 filed Feb. 16, 2009, which is hereby incorporated by reference herein in its entirety.

What is claimed is:

1. An imaging apparatus comprising:
an imaging unit configured to capture an image of an object and acquire image data;
an integration unit configured to calculate a white balance integration value for calculating a still image white balance control value from the image data acquired by the imaging unit in a still image recording mode;
a first calculation unit configured to calculate the still image white balance control value using the white balance integration value calculated by the integration unit;

a conversion unit configured to convert a white balance control value which is used to perform white balance processing on the image data acquired by the imaging unit in an electronic view finder (EVF) mode to the still image white balance control value on the basis of sensitivity information of said imaging unit; and a histogram processing unit configured to adjust color balance of the image data acquired by the imaging unit in the still image recording mode using the still image white balance control value converted from the white balance control value in the EVF mode and perform histogram processing for the image data acquired by the imaging unit in the still image recording mode in parallel with calculation of the white balance integration value by the integration unit.

2. The imaging apparatus according to claim 1, further comprising a white balance processing unit configured to perform white balance processing using the still image white balance control value calculated by the first calculation unit.

3. The imaging apparatus according to claim 1, further comprising a stability determination unit configured to determine whether the white balance control value which is used to perform the white balance processing on the image data acquired by the imaging unit in the EVF mode is stable, wherein, if the stability determination unit determines that the white balance control value is not stable, a second calculation unit sets a default white balance control value as the histogram white balance control value based on a shooting condition or a setting of the imaging apparatus.

4. The imaging apparatus according to claim 1, wherein a second calculation unit employs a default white balance control value as the histogram white balance control value based on a shooting condition or a setting of the imaging apparatus.

5. The imaging apparatus according to claim 4, wherein the second calculation unit employs, if the image data acquired by the imaging unit is image data acquired by flash photography, the default white balance control value as the histogram white balance control value.

6. The imaging apparatus according to claim 4, wherein the second calculation unit employs, if the imaging apparatus is set to adjust white balance using white paper as a target, a white balance control value which is acquired using the white paper as a target, as the histogram white balance control value.

7. The imaging apparatus according to claim 4, wherein the second calculation unit employs, if the imaging apparatus is set to manual white balance in which a white balance control value is fixed by designating a color temperature, a fixed white balance control value as the histogram white balance control value.

8. The imaging apparatus according to claim 2, further comprising a developing processing unit configured to perform developing processing on the image data on which the white balance processing unit performs the white balance processing, wherein the developing processing unit performs developing processing based on a developing parameter calculated based on a result of the histogram processing performed by the histogram processing unit.

9. A method for performing image processing comprising:
capturing an image of an object and acquiring image data;
calculating a white balance integration value for calculating a still image white balance control value from the acquired image data in a still image recording mode;
calculating the still image white balance control value using the calculated white balance integration value;
converting a white balance control value which is used to perform white balance processing on the image data acquired in an electronic view finder (EVF) mode to the still image white balance control value on the basis of sensitivity information;
adjusting color balance of the acquired image data in the still image recording mode using the still image white balance control value converted from the white balance control value in the EVF mode and performing the histogram processing for the image data acquired in the still image recording mode in parallel with calculation of the white balance integration value.

10. A non-transitory computer-readable medium for storing a program for executing a method comprising:
capturing an image of an object and acquiring image data;
calculating a white balance integration value for calculating a still image white balance control value from the acquired image data in a still image recording mode;
calculating the still image white balance control value using the calculated white balance integration value;
converting a white balance control value which is used to perform white balance processing on the image data acquired in an electronic view finder (EVF) mode to the still image white balance control value on the basis of sensitivity information;
adjusting color balance of the acquired image data in the still image recording mode using the still image white balance control value in the EVF mode and performing the histogram processing for the image data acquired in the still image recording mode in parallel with calculation of the white balance integration value.

* * * * *